Dec. 30, 1924.
C. C. KINKER
TAKE-OFF MECHANISM
Filed Feb. 10, 1921 2 Sheets-Sheet 2
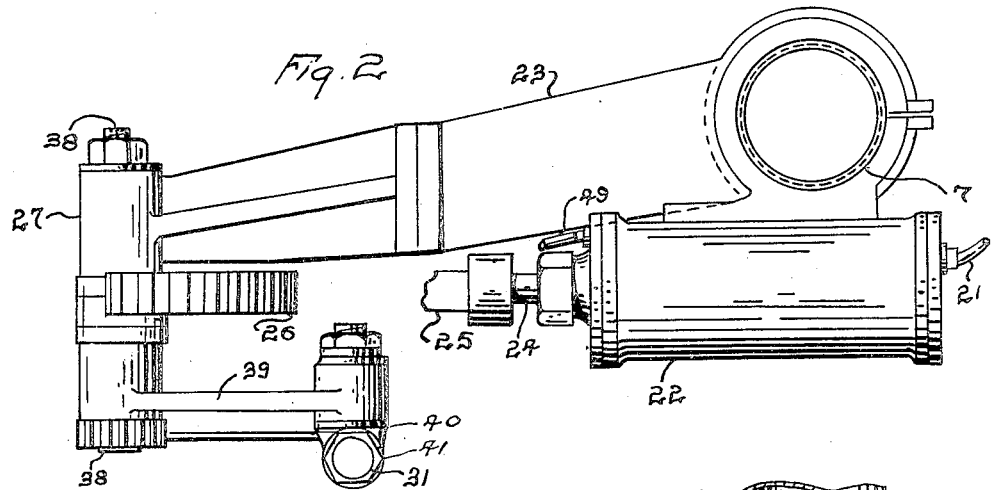
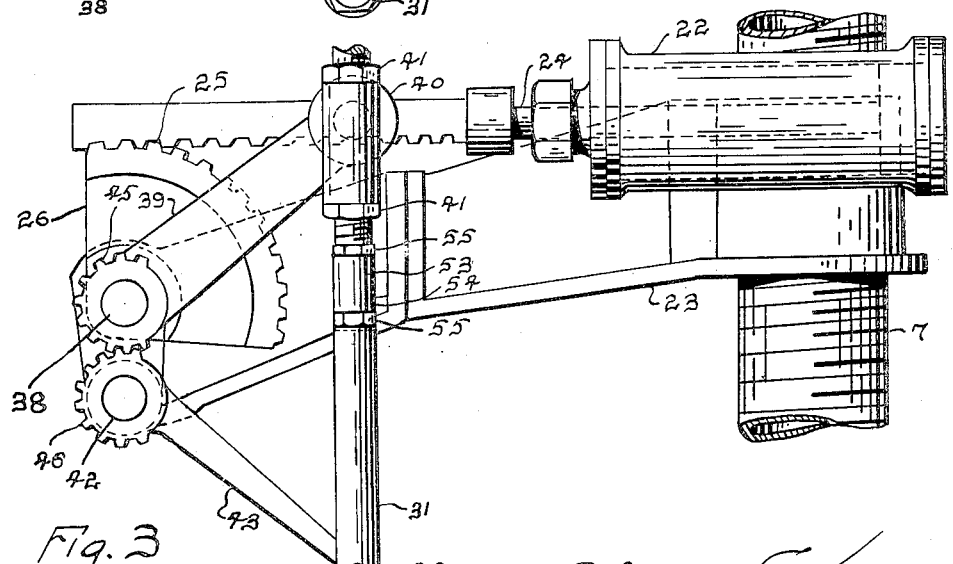
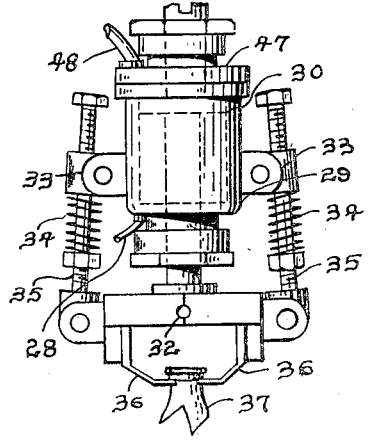
Clarence C Kinker
INVENTOR
BY
ATTORNEY Patented Dec. 30, 1924.

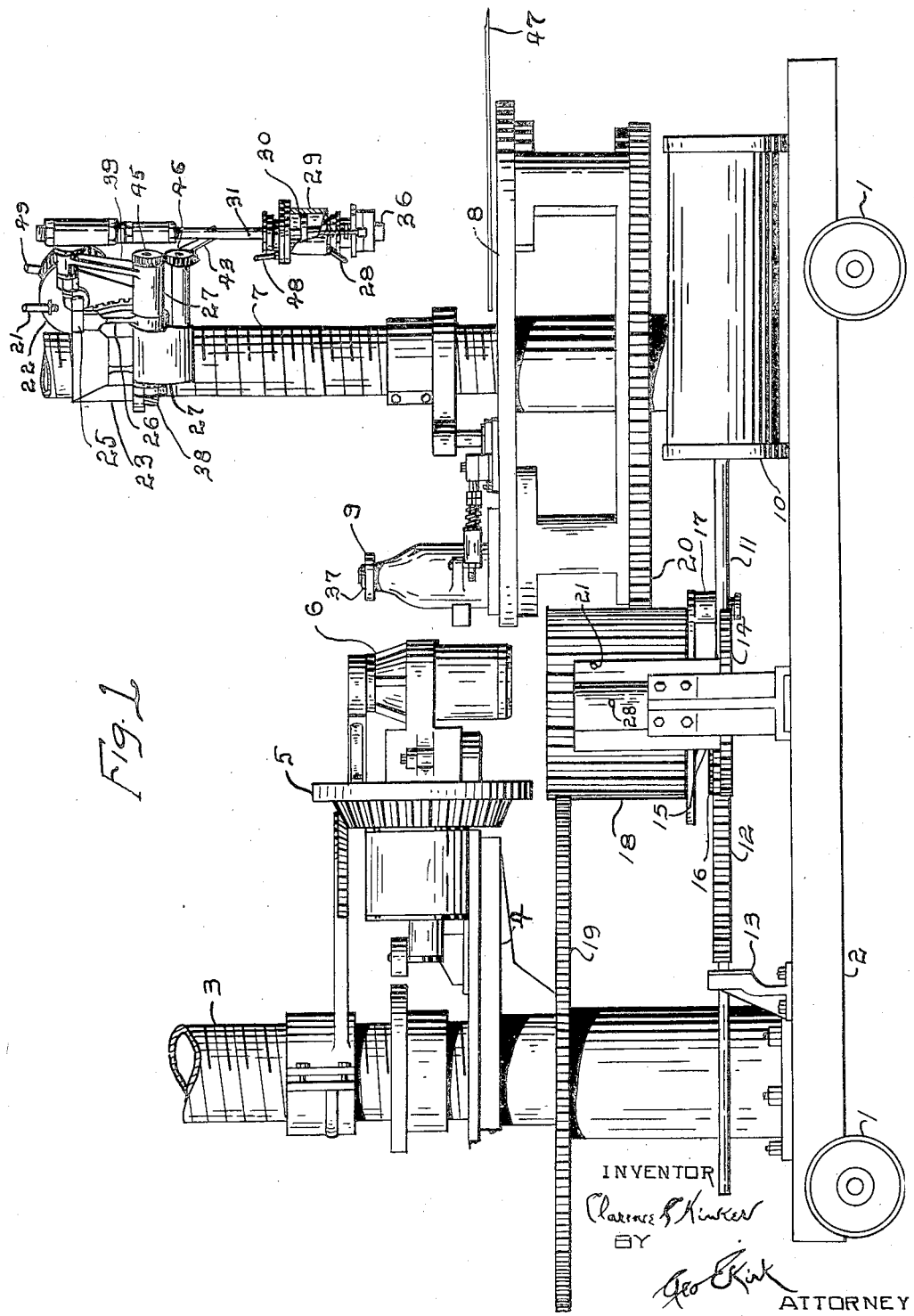

1,521,375

UNITED STATES PATENT OFFICE.

CLARENCE C. KINKER, OF TOLEDO, OHIO, ASSIGNOR TO THE O'NEILL MACHINE CO., OF TOLEDO, OHIO, A CORPORATION OF OHIO.

TAKE-OFF MECHANISM.

Application filed February 10, 1921. Serial No. 443,866.

*To all whom it may concern:*

Be it known that I, CLARENCE C. KINKER, a citizen of the United States of America, residing at Toledo, Lucas County, Ohio, have invented new and useful Take-Off Mechanisms, of which the following is a specification.

This invention relates to glassware handling apparatus.

This invention has utility when incorporated in take-off mechanism for bottle manufacturing machines.

Referring to the drawings:

Fig. 1 is a side elevation, with parts broken away, of a bottle blowing machine, having an embodiment of the take-off mechanism of this invention incorporated therewith;

Fig. 2 is a plan view of the take-off mechanism of Fig. 1; and

Fig. 3 is a side elevation of the take-off mechanism.

The instance of glassware handling or forming mechanism herein shown is a portable bottle blowing machine provided with wheels 1 carrying a main truck frame 2 from which rises blank mold carrying table column 3 carrying table 4 provided with rotatable disks 5 for orienting blank molds 6. The truck 2 carries a second column 7 for rotatable table 8 carrying blow molds 9.

On the truck frame 2 below the table 8 is shown main driving power cylinder 10 having protruding therefrom piston rod 11 provided with rack portion 12, and therebeyond a cylindrical portion guided by a stationary bracket 13 on the frame 2. One side of the rack portion 12 of the piston rod 11 is in mesh with a gear 14 for shifting a main control valve 15 determining general timing for the sequence of operations of the bottle blowing machine in the supplies of actuating fluid, herein shown as air.

The rack portion 12 of the piston rod 11 is also in mesh with toothed member 16 controllably connected by pin 17 to effect intermittent one direction driving of gear 18. This gear 18 is in mesh with blank table gear 19 and blow table gear 20, and at each step serves simultaneously to shift each table 60°, from one mold position to the succeeding mold position.

The glass charge may be supplied by gather and dropped from a punty, or by other manual or mechanical means brought to the blank mold 6 for the formation of the blank therein. The formed blank is transferred from the blank mold to the blow mold in the vicinity of the gear 18. After the ware or bottle is formed by the final blowing in the blow mold and such mold opened at the take-off station, the mechanism of this disclosure is then operative in sequence during the idle or recover stroke of the piston rod 11 when the gear 18 is disconnected, and the control valve 15 may admit air by line 21 to cylinder 22 carried by bracket 23 on the column 7.

The supply of air by the pipe 21 to the cylinder 22, thrusts piston rod 24 outward from the cylinder 22. This piston rod 24 has a rack section 25 in mesh with a segment 26 mounted in bearing 27 carried by the bracket 23. This bearing or axis for the swinging segment 26 is approximately parallel with the plane of the blow table 8, and the segment 26 has its movement of oscillation at an angle to the travel of the ware in the blow mold 9.

Before the outward thrust action of the piston rod 24, the control valve 15 as shown in detail in Frank O'Neill application S. N. 250,488, filed Aug. 19, 1918, has admitted air to line 28 connected to the lower side of shiftable cylinder 29, thereby thrusting the cylinder 29 downwardly as to its fixed piston 30 on piston rod 31 carrying below the cylinder 29 a pivot pin 32. As the cylinder 29 moves downwardly, ears 33 on said cylinder acting against springs 34 yieldably thrust links 35 for inwardly swinging gripping means 36 into holding engagement with ware 37 resting in the opened mold 9, or catching the protruding neck of such bottle as the mold is about to open or is opening.

The segment 26 is carried by bearing pin 38 in the bearing 27. Mounted on this pin 38 is arm 39 at its free end pivotally engaging block 40 adjustable by nuts 41 along the rod 31, providing a carrier for adjusting the position of the gripping means 37 as to the actuating cylinder 22 therefor.

One of the great points of value in glass manufacturing machinery is volume of output in a given time, and to this end it is desirable to have a high speed for practical operation. As in the machine of this disclosure, with bottles of some capacity, such ware may be produced easily at the rate of say fifteen per minute, the operation interval of the take-off mechanism is of necessity quite brief. Its position, especially as to the ware in the mold should be definite. To this end a supplemental bearing 42 is carried by the bracket 23 to take up undesirable swinging of the rod 31 as to the arm 39. This bearing 42 carries an arm 43 engaging a slot 44 in the rod 31. Segment 45 fast with the arm 39 is in mesh with the segment 46 fast with the arm 43. Accordingly in the lifting of the ware 37 and its travel outward and down, the rod 31 is held at the block 40 and at the slot 44 against any swinging from a vertical position to deliver ware to conveyor 47, as air by line 48 is supplied to upper side of the cylinder 29, to open the gripping means 36 and release ware 37 as the ware is slightly dropped or brought to rest on the conveyor 47, traveling in synchronism with the blow table 8.

The action of this take-off mechanism is simple and positive, for the single power actuation source effects the lifting of the ware as well as outward shifting thereof. The cylinder 22 for this dual purpose involves a compact structure, operating with a minimum of machine mass to be moved, and thereby keeps down objectionable machine vibration and wear. Air supply by line 49 brings about the recover or re-setting of the mechanism in repeating the take-off operations. In operation, when the blow table 8 comes to rest with blow mold 9 below the gripping devices 36, such devices are swung downward on the axis 32 to engage a bottle top. At once this engagement occurs, the rack 25 has started in its outward travel, effecting through the arm 39, a lifting of the depending rod or member 31. While the arm 39 is swinging in its operation upon horizontal axis or bearing for the pin 38, the depending member 31 is held in depending position against swinging but to parallel travel by the arm 43. As the outer end of the stroke of the piston rod 24 is reached, the gripping jaws 35 release the ware to allow such to be deposited upon conveyor 47, and the reverse travel of the rack 25 brings the parts to starting position back over the table for a repetition of the cycle of operations.

What is claimed and it is desired to secure by Letters Patent is:

1. A glass bottle machine having a traveling mold, means for opening the mold, a grip for engaging a bottle in the opened mold, and an upward swing device for lifting the engaged bottle and moving the bottle in a vertical plane outward in taking the bottle from the machine, said device embodying a fixed bearing, an upwardly inclined arm therefrom, and a depending member from the arm for carrying the grip.

2. A glassware handling machine having a mold for forming ware, a grip for engaging ware formed by the mold, and an upwardly outwardly swinging mounting for shifting the grip and held ware in a vertical plane away from the mold, said mounting embodying an upwardly inclined arm, and a depending member therefrom for carrying the grip.

3. A glassware handling machine having means for releasing an article of ware, a grip for engaging the released ware, and means for upwardly in a vertical plane swinging the grip and held ware outward from the machine embodying a depending member for carrying the grip, and means for directing the member for parallel movement in swinging the grip.

4. A glassware handling machine embodying a rotary table, and a horizontal axis swing take-off device for removing ware in a vertical plane from the table embodying a depending member for carrying the grip, and means holding the member in depending position during said ware removal.

5. A glassware handling machine embodying a rotary table, molds on the table, a column for mounting the table, a bracket carried by the column and including a bearing at an angle to the axis of the table, and a take-off device swingable from the bearing to remove ware from the table.

6. A glassware handling machine, an intermittently rotatable table, a blow mold on the table, a column carrying the table, a bracket radially extending from the column above the table, and a grip carrying arm carried by the bracket to swing upward from the table and away from the column in removing ware from the table.

7. A glass forming machine embodying a movable table, provided with a column, a bracket from the column over the table, a grip carrying swinging arm extending above the table for removing ware from the table, a segment movable with the arm, a rack for actuating the segment, and means carried by the bracket for directing the actuated arm.

8. A glass forming machine embodying a movable table, a grip carrying swinging arm for removing ware from the table, a rack and segment device for actuating the arm, and movable means for directing the swinging of the arm.

9. A glass forming machine embodying a movable mold for forming ware, a grip carrying swinging arm for removing formed ware from the mold, and a parallel motion device for restricting the swinging of the ware carried by the arm.

10. A glass handling machine embodying a movable support for ware, gripping means for engaging ware on the support, an adjustable mounting for the gripping means, a swinging arm held for movement in a vertical plane to which the mounting is connected, and means providing a horizontal axis fixed bearing for the arm, said arm operable to shift ware from the support as such ware is engaged by the gripping means.

11. A glass handling machine embodying a movable support for ware, gripping means for engaging ware on the support, a single piston and cylinder device lifting and shifting to discharge position the gripping means with the engaged ware, and directing means holding the gripping means depending during shifting.

12. A glass handling machine embodying a movable support for ware, gripping means for engaging ware on the support, a cylinder and piston actuated rack, a segment engaged by the rack to shift the gripping means, and directing means holding the gripping means depending during shifting.

In witness whereof I affix my signature.

CLARENCE C. KINKER.